Aug. 23, 1960 V. J. COOPER 2,950,440

PHASE-AMPLITUDE CHARACTERISTIC CORRECTION CIRCUIT ARRANGEMENTS

Filed Dec. 14, 1955

INVENTOR:
Victor James Cooper
BY: Baldwin & Wight
ATTORNEYS

United States Patent Office 2,950,440

Patented Aug. 23, 1960

2,950,440

PHASE-AMPLITUDE CHARACTERISTIC CORRECTION CIRCUIT ARRANGEMENTS

Victor James Cooper, Chelmsford, England, assignor to Marconi's Wireless Telegraph Company Limited, London, England, a British company Filed Dec. 14, 1955, Ser. No. 553,107

Claims priority, application Great Britain Jan. 18, 1955

5 Claims. (Cl. 328—155)

Figure 1:
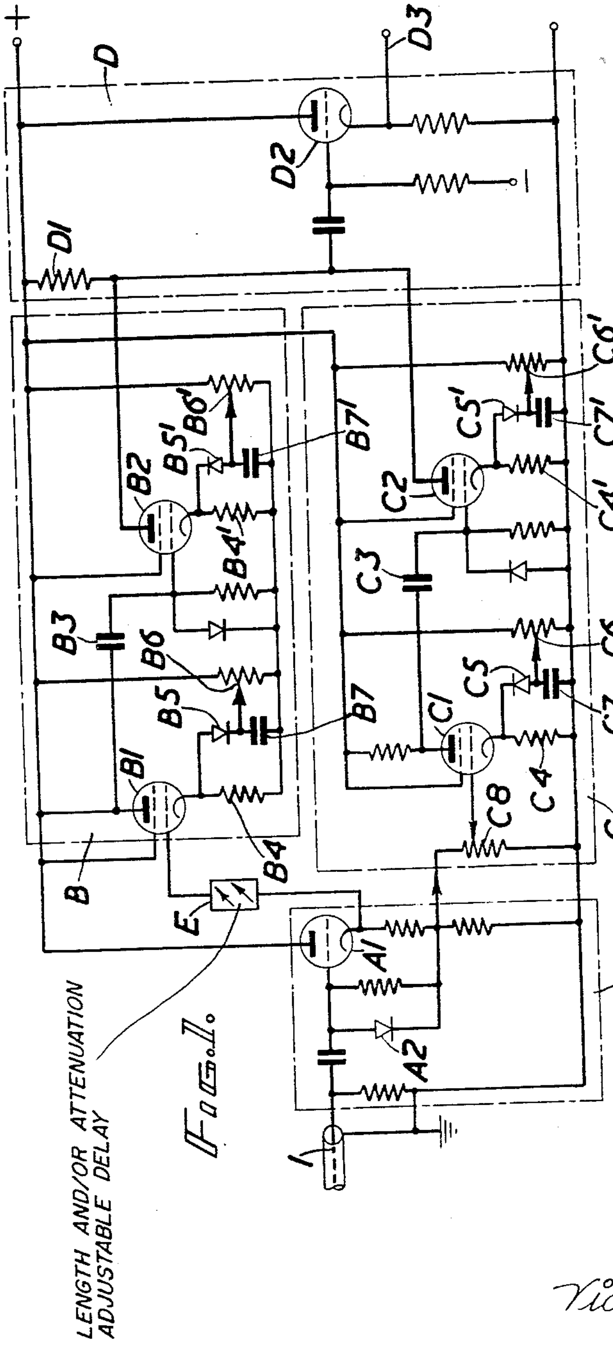

This invention relates to phase-amplitude characteristic correction circuit arrangements, that is to say to arrangements whereby a desired correction of the relationship between the phase and the amplitude of a signal may be obtained.

Although of general application to all cases where it is required to correct the phase-amplitude characteristics of an amplifier or other apparatus, the invention is particularly applicable to, and primarily intended for, color television systems wherein color information is carried on a sub-carrier specially provided therefor.

One of the difficulties met with in the known recently proposed color television systems wherein color information is carried on a sub-carrier, is that if fidelity of color "hue" is to be preserved over the range of amplitudes corresponding to the range of brightness it is necessary that the signal transmission system shall not, as a result of changes in the amplitude, i.e. in the brightness level, introduce more than a few degrees of phase shift of the signal components carrying the color information. In other words, it is a requirement that the so-called chrominance signals shall remain to within a few degrees of the condition of constant phase for all possible values of brightness. This requirement is extremely difficult to satisfy in practice because conventional signal transmission systems include non-linear impedances and accordingly introduce change of phase with change of amplitude. Although theoretically it is possible to linearize every impedance in a transmission system this would obviously be both uneconomical and difficult, especially in the case of the power amplification stages of a transmitter.

The present invention when applied to the solution of this problem enables the designer of the transmission system to use conventional apparatus which will introduce change of phase with change of amplitude and to eliminate the undesired effects of this by preceding the apparatus in question with a phase-amplitude characteristic correction circuit arrangement in accordance with the present invention and designed to compensate for the known undesired phase-amplitude characteristics of the said conventional apparatus without introducing any substantial additional amplitude non-linearity.

According to this invention a phase-amplitude characteristic correction circuit arrangement comprises means for subjecting signals to amplification by two amplifiers of different pre-determined non-linear input-output amplitude characteristics and together having a substantially linear overall input-output amplitude characteristic and means for combining the amplified resultants to provide an output whose mean phase is dependent on the varying amplitude levels from the two amplifiers.

The signals to be subjected to phase-amplitude correction may be applied in parallel to the two amplifiers and their outputs fed to a combining circuit, the required combination with a mean phase dependent on the varying amplitude levels from the two amplifiers being obtained by including a delay circuit in one of said amplifiers.

Alternatively one of the amplifiers may have its input circuit fed in parallel with a delay circuit and be arranged to feed, together with the delay circuit, into a combining circuit, the other amplifier and the combination of said one amplifier, delay circuit and combining circuit being in cascade relation to each other.

Figure 2:
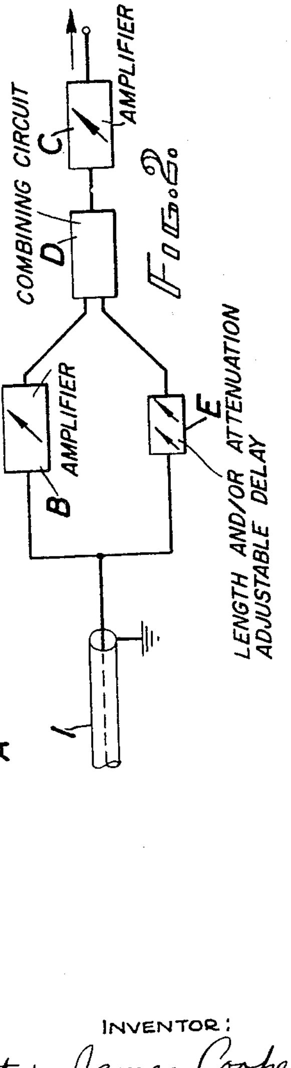

The invention is illustrated in the accompanying drawings in which Fig. 1 is a diagram of one embodiment and Fig. 2 is a simplified block diagram showing a modification.

Referring to Fig. 1 the apparatus therein shown comprises five main units marked respectively A, B, C, D and E of which the first four are shown within chain line rectangles. The first block A is a cathode follower which receives input—for example a color television signal including chrominance signals as hereinbefore referred to—from means such as an input cable 1. The cathode follower includes a valve A1 connected in the usual way and with its grid circuit including a rectifier A2 (such as a diode) suitably connected as well known to provide D.C. restoration. Output from the cathode circuit of the valve A1 is taken to the two units B and C in effective parallel, both these units being non-linear amplifiers with, however, different predetermined laws of non-linearity. The input path to the unit B includes a delay line unit E whose length and attenuation are preferably individually adjustable, a fact which is indicated by the showing of two arrows on the block representing the same.

Amplifier B has two valves B1 and B2 coupled in cascade through the condenser B3. Valve B1 has a cathode resistance B4 shunted by a non-linear element represented as a rectifier B5 and which may be for example a diode, the bias of which can be adjusted by means of a potentiometer B6. B7 is a condenser offering an impedance which is of negligibly low value as compared to that of the bias potentiometer. In dependence upon the setting of the potentiometer B6 the rectifier B5 will be conductive over part of the amplitude range and non-conductive over the other part. Since the D.C. component of the signal is retained, the part of the amplitude range over which the rectifier B5 changes condition from conductive to non-conductive will remain relatively constant. Thus, for a linear amplitude change from say "black" to "white" at the grid of the valve B1 there will be a non-linear change at the anode of that valve.

The second stage included in the unit B and comprising the valve B2 is similar to the first and corresponding elements in the two stages are accordingly indicated by corresponding references with a prime (′) suffix to distinguish elements in the second stage. A D.C. restoring rectifier is connected as shown in the control grid circuit of the second stage.

The other amplifier C is complementary to the amplifier B. Like parts in the amplifier C are designated by the same references as are those in the amplifier B except that the initial letter C is substituted for the initial letter B in the said references. Due to this method of referencing the circuit will be generally self explanatory from the figure. In both amplifiers B and C, the polarities of connection of the rectifiers B5 and B5′ on the one hand and C5 and C5′ on the other, are chosen to give a predetermined desired change of impedance at each stage (i.e. either rising or falling with increase of amplitude of signal) but it will be observed that the polarities of connection of the corresponding rectifiers B5 and C5 on the one hand and B5′ and C5′ on the other, are reversed with respect to one another. The laws of non-linearity of the amplifier stages in the unit C are thus so chosen and adjusted with relation to those of the amplifier stages in the unit B as to be complementary thereto, so that the overall law of the two amplifiers taken together (i.e. as measured at a common output circuit) is substantially linear.

Apart from the difference in the laws of non-linearity the only difference between the two amplifiers lies in the fact that an additional amplitude adjustment provided by the potentiometer C8 is connected between cathode follower A and the input valve C1 of amplifier C.

The outputs from the two amplifiers B and C are combined in a resistance D1 common to the anode circuits of the valves B2 and C2 and fed to a combining valve D2 shown as a cathode follower, output being taken off at D3 from the cathode.

Since there is a delay circuit E in the input to the amplifier B and no corresponding delay circuit in the input to the amplifier C, the signals arriving at the combining unit D will not be in phase and the output at D3 will be of a mean phase at any brightness level. This mean phase will depend, for any given setting of the adjustable delay circuit E, on the output levels from the two amplifiers B and C and thus by suitably setting the various adjustments provided almost any desired phase-amplitude correction law can be obtained within a very wide range of correction law without, however, introducing significant amplitude distortion.

In view of the detailed description given with regard to Fig. 1 it is thought that the modified arrangement shown in the block diagram form in Fig. 2 will be almost self evident from that figure.

Referring to Fig. 2 the principal difference between the arrangement of this figure and that of Fig. 1 is that, instead of arranging the two amplifiers B and C in effective parallel both on their input and output sides with a delay circuit in the feed to one of them, the delay circuit, which again is preferably of variable delay and attenuation, is connected in parallel with one amplifier on its input side and feeds its output to a combining circuit to which is also fed the output from the amplifier with which said delay circuit is in parallel. A complementary non-linear second amplifier follows the combining circuit. In Fig. 2, 1 is the input cable, B is one non-linear amplifier, E is the adjustable delay circuit, D is the combining circuit and C is the second non-linear amplifier. As before, the non-linear amplifiers B and C are adjusted to have substantially complementary non-linearity, due regard however being paid to the fact that the input to the amplifier C has already received amplification in the amplifier B; that is to say, the amplifiers C and B are complementary in the sense that the combined overall amplitude characteristic is linear, though the phase-amplitude characteristic as before depends on the proportion of the output contributed for different input amplitudes by the two amplifier units. Obviously the arrangement of Fig. 2 could be further modified, and the same overall result obtained, by connecting one of the two non-linear amplifiers in the channel preceding the parallel connected other amplifier and delay circuit—i.e. by connecting said one amplifier immediately after the input cable—instead of, as shown in Fig. 2, in the channel following the combining circuit.

I claim:

1. A phase-amplitude characteristic correction circuit comprising the parallel connected combination of two complementary non-linear amplifiers, each including a non-linear element in the circuit thereof, the correction circuit having a substantially linear overall input-output amplitude characteristic, means for applying an input signal to both said amplifiers, delay means connected between one of said amplifiers and said input means for establishing a relative phase difference between the output signals of the amplifiers thereof, and means for combining said output signals.

2. A circuit arrangement as set forth in claim 1 wherein each amplifier includes two stages, one preceding the other, and each having a non-linear element in its circuit, the non-linear element in the circuit of one stage being oppositely connected in relation to the non-linear element in the circuit of the other stage and the non-linear elements in corresponding stages of the two amplifiers being also oppositely connected in relation to one another.

3. A circuit arrangement as claimed in claim 2 wherein each amplifier includes two stages, one preceding the other, and each having a non-linear element in its circuit, the non-linear element in the circuit of one stage being oppositely connected in relation to the non-linear element in the circuit of the other stage and the non-linear elements in corresponding stages of the two amplifiers being also oppositely connected in relation to one another, said stages each including a cathode return circuit and wherein the non-linear elements are rectifiers connected in the cathode return circuits of their respective stages.

4. A circuit arrangement as set forth in claim 2 wherein each amplifier includes two stages, one preceding the other, and each having a non-linear element in its circuit, the nonlinear element in the circuit of one stage being oppositely connected in relation to the non-linear element in the circuit of the other stage and the non-linear elements in corresponding stages of the two amplifiers being also oppositely connected in relation to one another, said stages each including a cathode return circuit, and comprising means for applying individually adjustable biasses to the non-linear elements.

5. A circuit arrangement as claimed in claim 1 wherein one of the amplifiers has its input circuit fed in parallel with a delay circuit and is arranged to feed, together with the delay circuit, into a combining circuit, the other amplifier and the combination of said one amplifier, delay circuit and combining circuit being in cascade relation to each other, and wherein the delay means is adjustable as to length and/or attenuation.

References Cited in the file of this patent

UNITED STATES PATENTS

| | | |
|---|---|---|
| 1,806,657 | Wintringham | May 26, 1931 |
| 1,890,543 | Holden | Dec. 13, 1932 |
| 2,066,284 | Ballantine | Dec. 29, 1936 |
| 2,175,270 | Koch | Oct. 10, 1939 |
| 2,246,771 | Zuccarello | June 24, 1941 |
| 2,253,313 | Wilson | Aug. 19, 1941 |
| 2,255,476 | Thomas et al. | Sept. 9, 1941 |
| 2,266,197 | Hansell | Dec. 16, 1941 |
| 2,457,559 | Huber | Dec. 28, 1948 |
| 2,551,529 | Davis et al. | May 1, 1951 |
| 2,552,136 | Beurtheret | May 8, 1951 |
| 2,621,253 | Meers | Dec. 9, 1952 |
| 2,692,333 | Holmes | Oct. 19, 1954 |
| 2,703,364 | Birnbaum | Mar. 1, 1955 |
| 2,717,931 | Duke | Sept. 13, 1955 |

FOREIGN PATENTS

| | | |
|---|---|---|
| 562,482 | Great Britain | July 4, 1944 |